United States Patent
Thoumy et al.

(10) Patent No.: US 8,213,349 B2
(45) Date of Patent: Jul. 3, 2012

(54) METHOD AND DEVICE FOR ANTENNA TRACKING

(75) Inventors: François Thoumy, Vignoc (FR); Mickaël Lorgeoux, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 306 days.

(21) Appl. No.: 12/554,421

(22) Filed: Sep. 4, 2009

(65) Prior Publication Data

US 2010/0054229 A1    Mar. 4, 2010

(30) Foreign Application Priority Data

Sep. 4, 2008   (FR) ...................................... 08 55947

(51) Int. Cl.
*H04W 4/00* (2009.01)
*H04B 7/212* (2006.01)

(52) U.S. Cl. ......... 370/314; 370/336; 370/338; 370/345

(58) Field of Classification Search .......................... None
See application file for complete search history.

(56) References Cited

U.S. PATENT DOCUMENTS

| | | |
|---|---|---|
| 7,039,120 B1 | 5/2006 | Thoumy et al. |
| 2002/0167954 A1* | 11/2002 | Highsmith et al. ........... 370/406 |
| 2003/0144032 A1* | 7/2003 | Brunner et al. ............... 455/562 |
| 2007/0270155 A1 | 11/2007 | Nelson, Jr. et al. |
| 2008/0151745 A1 | 6/2008 | Rahm |
| 2009/0034491 A1* | 2/2009 | Adams et al. ................. 370/337 |
| 2009/0140941 A1 | 6/2009 | Lorgeoux et al. |
| 2009/0290517 A1* | 11/2009 | Rao et al. ...................... 370/280 |

FOREIGN PATENT DOCUMENTS

WO     2007116398 A2    10/2007

OTHER PUBLICATIONS

French Search Report in FR 0855947, dated Apr. 27, 2009.

* cited by examiner

*Primary Examiner* — Chi Pham
*Assistant Examiner* — Soon-Dong Hyun
(74) *Attorney, Agent, or Firm* — Fitzpatrick, Cella, Harper & Scinto

(57) ABSTRACT

In a mesh network using a TDMA protocol: determination is made of a first set of antenna angles to be used by a receiving antenna of a recipient node to capture data respectively sent by a plurality of sending nodes; reception is made of data sent by the sending nodes using the respective antenna angle of the first set; at least one correlation operation is made between the various redundant copies of the same item of data, received by the recipient node; at least one copy not necessary for the decoding of the received data is deduced determination is made of at least one time slot during which the copy not necessary for the decoding is received; and during that time slot, the antenna angle used by the receiving antenna to receive data sent by the sending node allocated to that time slot is updated.

15 Claims, 6 Drawing Sheets

METHOD AND DEVICE FOR ANTENNA TRACKING

TECHNICAL FIELD

The present invention relates to a method and to a device for antenna tracking.

More particularly, the present invention concerns the optimization of the orientation of a receiving antenna, in a mesh communication network using a TDMA ("Time Division Multiple Access") protocol.

BACKGROUND OF THE INVENTION

At present, wireless home audio/video applications are increasingly numerous. They require payload data rates of the order of 1 Gbps, a continuously rising quality of service and up to ten meters range.

A wireless personal network of mmWave WPAN ("Millimeter Wave Wireless Personal Area Network") type is particularly well-adapted to this type of application. More particularly, it uses the 60 GHz radio band, in which the wavelengths are of the order of the millimeter, which gives high bandwidth and so enables the transport of a high quantity of data.

The physical properties of the 60 GHz radio band and the legal restriction on power of the transmitters limits communications to a maximum of about ten meters. Indeed, at these frequencies, the degree of reflection on obstacles (walls, furniture, living entities, etc.) is very slight and the degree of attenuation in the air is great. In practice, this makes it necessary for the nodes of a mmWave WPAN to use directional antennae having a high gain.

Advantageously, the various nodes of a mmWave WPAN use so-called "smart antennae" to attain the distances required by the home audio/video applications.

A smart antenna is constituted by a network of radiating elements in an array distribution on a support. This type of antenna enables the implementation of the technique referred to as "beam forming". According to this technique, the phase and power of each radiating element of the antenna is electronically controlled to obtain a directable transmission and/or reception beam that is narrow to a greater or lesser extent.

Advantageously, when nodes are in transmission mode (denoted Tx), their smart antenna is adjusted to provide a wide transmission beam, in order to be able to reach a maximum number of receiver nodes. When the nodes are in reception mode (denoted Rx), their smart antenna is set to provide a narrow and directable reception beam, in order to increase the gain of the antenna and direct it towards the sending node.

In Rx mode, each node directs its antenna at an angle adapted to the reception of the data coming from a sending node Tx. For each new transmitter, each node in Rx mode must therefore direct its antenna at a new angle adapted to the position of the new Tx node.

The search for the best receiving antenna angle is a major problem in networks using directional antennae. In the case of a network in which the exact positions of the devices are not reliably known, it is often necessary to exhaustively sweep through the all the possible angles in order to choose the best one.

This is all the more the case in systems of mmWave WPAN type, since, due to the wavelengths used and the spatial context, combinations of direct and reflected signals may appear, so creating local energy maxima and minima. It may be that the search for a local maximum will not lead to the optimum antenna angle and it could be useful to sweep through all the possible angles to search for a possible better angle.

The main drawback of this method is that it cannot be applied when a communication is in course, since it leads to checking beam orientations which do not allow reception of the data transmitted by the transmitter considered; it thus leads to a loss of data during that time.

A difficulty to resolve when it is desired to form a communication network of mmWave WPAN type based on a TDMA protocol is to be able to rapidly and reliably indicate the angle that the receiver antenna must adopt for each of the time slots during which the different nodes of the network send.

Precise pointing of the antenna is difficult to maintain since the wavelengths used in these systems are very short and thus the slightest movement of the nodes or a variation in the precision of pointing (for example temperature drift, ageing of the electronics) will affect the reception quality of the radio signal.

It is thus appropriate to produce a means for dynamic tracking or pointing of the antenna beam, such that it enables the best possible reception of the data sent by each transmitter.

The problem of the acquisition and the tracking of the antenna angle for a directional beam is a known problem and several proposals have been made to solve it.

In particular, the document IEEE 802.15-07/942r2 "Beam forming and tracking" issued by the workgroup IEEE P802.15 Wireless Personal Area Network in May 2008 proposes an algorithm for updating the antenna beam. In this proposal, the acquisition of the beam is only made on starting up or when the reception of the data fails. There is no anticipation of the need to re-adjust the angle of the antenna before loss of the data.

SUMMARY OF THE INVENTION

The present invention aims to mitigate the drawbacks of the prior art.

With that aim, the present invention provides a method of optimizing the orientation of a receiving antenna of a recipient node, in a mesh communication network comprising a plurality of sending nodes and using a time division multiple access protocol in which each sending node is allocated to a predetermined time slot, the recipient node receiving a plurality of redundant copies of the same item of data sent by the sending nodes, the method being remarkable in that it comprises steps of:

determining a first set of antenna angles to be used by the receiving antenna to capture data respectively sent by each of the sending nodes of the network;

receiving data sent by each of the sending nodes using the respective antenna angle of the first set of antenna angles;

performing at least one operation of correlation between the various redundant copies of the same item of data, received by the recipient node;

on the basis of those correlation operations, determining at least one redundant copy that is unnecessary for the decoding of the data received during the receiving step;

determining at least one time slot during which the redundant copy or copies that are unnecessary for the decoding are received; and during that time slot or those time slots, updating the antenna angle used by the receiving antenna to receive data sent by the sending node allocated to that time slot or those time slots.

Thus, the present invention exploits a feature of the mesh network to provide a means for dynamic pointing of the antenna beam enabling the latter to provide the best possible reception of the data sent by each sending node of the network.

Indeed, the invention makes it possible to re-adjust the pointing angle of the receiving antenna dynamically, without requiring a specific setting sequence and without disturbing the reception of the data sent by the source, by taking advantage of the redundancy of the data sent by the mesh network.

This makes it possible to continuously optimize the orientation of the antennae and to compensate for possible drift, whether it arises from the radio system or from the position of the nodes if these are liable to be moved.

In a particular embodiment, the method further comprises a selecting step, consisting of hierarchizing the redundant copies determined as unnecessary for the decoding of the received data, on the basis of a chosen priority criterion, so as to select a predetermined number of time slots from among the time slots during which the unnecessary redundant copies are received. In this embodiment, the antenna angles used by the receiving antenna to receive data sent by the sending nodes allocated to the selected time slots are updated.

The antenna angles of certain nodes are thus updated in priority.

Advantageously, the type of data conveyed is taken into account to determine whether transmission errors are acceptable or not. For example, asynchronous data may withstand a certain amount of latency and thus be re-sent over several frames in case of transmission errors due to a sub-optimal positioning of the antenna angle. On the other hand, isochronous data such as audio/video data must in general be transmitted with very low latency and it is thus important to ensure the transmission quality of these data. By allocating a priority-taking criterion to the node sending these data, the corresponding antenna angles are updated more often, which enables the transmission quality to be improved.

According to a particular feature, the priority criterion is the probability of the node sending a redundant copy being moved.

This makes it possible to correlate the frequency of updating the antenna angle with the risk of that angle not being optimum.

For example, if a node is light and not fixed, the probability of it being moved is non-negligible and the antenna angle that should be used for the best possible reception of the data it sends could frequently vary. It is thus advantageous to perform the updating of this angle more frequently than the updating of the antenna angles to use to receive the data sent by fixed nodes.

In a particular embodiment, in which the data sent are organized in the form of packets constituted by symbols, the step of performing at least one operation of correlation between the various redundant copies of the same item of data comprises:

a step of unitary correlation, consisting of correlating each of the symbols constituting a received packet with the corresponding symbol belonging to each of the copies received previously of the same packet; and a step of multiple correlation, consisting of correlating each of the symbols constituting a received packet with the corresponding symbol belonging to a group of M copies received previously of the same packet, M successively having the value from 2 to the total number of copies previously received of the same packet.

This enables the identification of redundant copies in the case in which all the symbols constituting a packet are not identical between two copies but in which the entirety of the message sent may be reproduced using a group of M copies previously received of the same packet.

In a particular embodiment, in which the data sent are organized in the form of packets constituted by symbols, and in which a correlation threshold is defined for a data packet as the total number of correlation operations between two symbols for which the bits constituting the two symbols are not all identical pairwise, the method comprises a step of determining whether, at the issue of the correlation operations, at least one correlation threshold is less than a predetermined critical threshold.

This makes it possible to avoid determining redundant copies when those copies do not have a sufficient correlation threshold, that is to say are not sufficiently similar.

According to a particular feature, when the method utilizes an error correcting code, the aforementioned critical threshold depends on the maximum number of erroneous symbols that the error correcting code can correct within the same packet.

This makes it possible to avoid choosing too high a critical threshold, when after application of the error correcting code, the rejected copies would have been considered as redundant.

In a particular embodiment, the network is of mmWave WPAN ("Millimeter Wave Wireless Personal Area Network") type.

This environment, in which the use of directional antennae is appropriate to increase the gain, is particularly adapted to the implementation of the present invention.

With the same aim as that stated above, the present invention also provides a device for optimizing the orientation of a receiving antenna of a recipient node, in a mesh communication network comprising a plurality of sending nodes and using a time division multiple access protocol in which each sending node is allocated to a predetermined tire slot, the recipient node receiving a plurality of redundant copies of the same item of data sent by the sending nodes, the device being remarkable in that it comprises:

a module for determining a first set of antenna angles to be used by the receiving antenna to capture data respectively sent by each of the sending nodes of the network;

a module for receiving data sent by each of the sending nodes using the respective antenna angle of the first set of antenna angles;

a module for performing at least one operation of correlation between the various redundant copies of the same item of data, received by the recipient node;

a module for determining, on the basis of the correlation operations, at least one redundant copy that is unnecessary for the decoding of the data received by the receiving module;

a module for determining at least one time slot during which the redundant copy or copies that are unnecessary for the decoding are received; and a module for updating, during that time slot or those time slots, the antenna angle used by the receiving antenna to receive data sent by the sending node allocated to that time slot or those time slots.

Still with the same aim, the present invention also concerns an information storage means which can be read by a computer or a microprocessor storing instructions of a computer program, remarkable in that it makes it possible to implement an optimization method as succinctly described above.

Still with the same aim, the present invention also concerns a computer program product able to be loaded into a programmable apparatus, remarkable in that it comprises sequences of instructions for implementing an optimization method as succinctly described above, when that program is loaded and executed by the programmable apparatus.

As the particular features and the advantages of the optimization device, of the information storage means and of the computer program product are similar to those of the optimization method, they are not repeated here.

BRIEF DESCRIPTION OF THE DRAWINGS

Other aspects and advantages of the invention will appear from reading the following detailed description of particular embodiments, given by way of non-limiting example. The description refers to the accompanying drawings, in which.

DETAILED DESCRIPTION OF THE INVENTION

Figure 1:
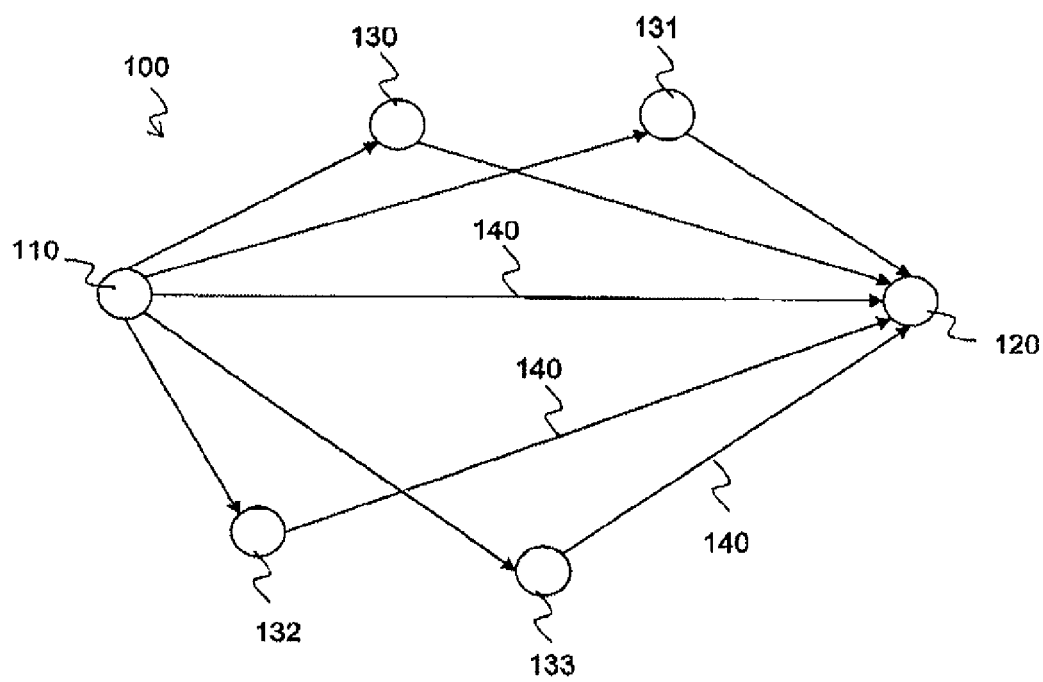
FIG. 1 is a diagram of a wireless communication network of the type to which the present invention applies, in a particular embodiment.

Consideration is made here of a wireless communication network with multiple transmissions, or mesh network, of the type illustrated in FIG. 1.

A mesh network is constituted by a set of nodes linked by communication lines enabling the choice or the combination between several routes linking an entry to the network and an exit.

The mesh network 100 comprises a source device 110, a destination device 120 and a plurality of relay devices 130, 131, 132, 133. Each relay device may also be a source and/or a destination apparatus.

The devices are interconnected by radio communication links 140. Even if the radio signals are broadcast in all directions, some relay or destination devices may be unable to detect said signals due to obstacles or the directivity of the antennae. A radio link is thus not necessarily present between a source device and all other devices of the network.

In the non-limiting example represented, the destination device 120 may thus receive up to five copies of the same data stream, directly from the source device as well as via four relay devices.

The data stream is constituted by a plurality of data blocks and is protected conventionally against transmission errors via the use of an error correcting code.

Generally, the data blocks of the data stream are grouped together into packets, at the source device, each packet then being coded so as to generate a plurality of parity blocks representing redundant information.

At the destination device, the received packets are decoded. The decoding consists of removing the potential errors in the received data blocks using the parity blocks for this.

The relay devices, for their part, perform the transfer of the coded packets "as is", without decoding or recoding the data stream. This is because the execution of the decoding and the recording at each relay device would exhaust the memory consumption necessary for the temporary storage of the packets, and would moreover increase the transmission time while pointlessly consuming computing resources.

To send a data stream relative to an audio stream, a video stream or a combination of both, a synchronous physical layer is traditionally used. A synchronous physical layer enables each peripheral of the network to transmit the information evenly distributed in time slots.

This may be carried out using time division multiplexing (TDM), which provides a division of the time domain into a plurality of recurrent time slots, of fixed length, also termed TDM sequence or cycle. Such multiplexing enables some parameters such as the latency or the rate of data to remain constant. It also provides a very high quality of service and maintains that quality at a constant level.

Figure 2:
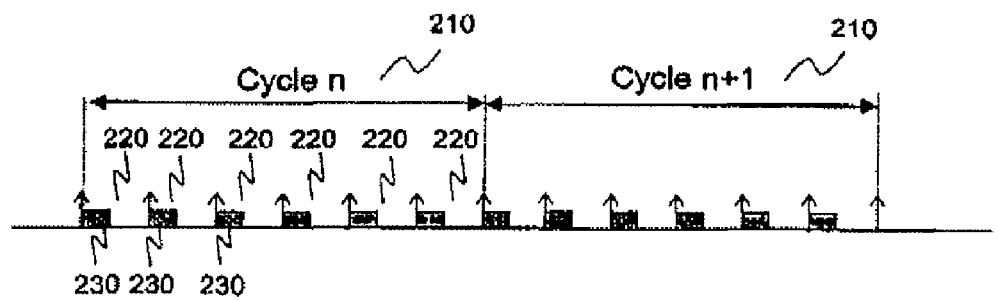
FIG. 2 is a diagram of a network physical layer example operating on the Time Division Multiplex (TDM) principle.

FIG. 2 illustrates a physical layer example operating on the principle of a synchronous TDM.

The TDMA protocol is a multiplexing mode enabling several signals to be transmitted over a single channel. It is a case of temporal multiplexing, of which the principle is to divide the available time between the different connections or users. Each node of a radio network may thus in turn send over the same radio channel, the other nodes then being either in reception mode, or in another mode that does not interfere with the radio channel (for example: standby, data post-processing).

As FIG. 2 shows, the time is divided into TDM cycles or sequences 210 and the physical support is shared over time, such that each of the devices of the network has attributed to it one time slot 220 per cycle to transmit its data 230.

When an apparatus transmits data in its time slot, all the other apparatuses can listen to it. Each time slot can transport zero, one or several data stream blocks, depending on the rate of that data stream; thus each of said data blocks also corresponds to a transmission slot.

In addition to the data packets, of its own or relayed, each device of the system also has attributed to it at least one transmission slot within its time slot 220 in order to transmit additional control data.

Each of the data packets may itself be divided into a plurality of sub-blocks or symbols. The relay devices of the network furthermore re-transmit data packets to third-party devices of the network such that, at the end of the cycle, the packets received in the different time slots represent different copies of the same original copy sent by the source device in its time slot.

Figure 3:
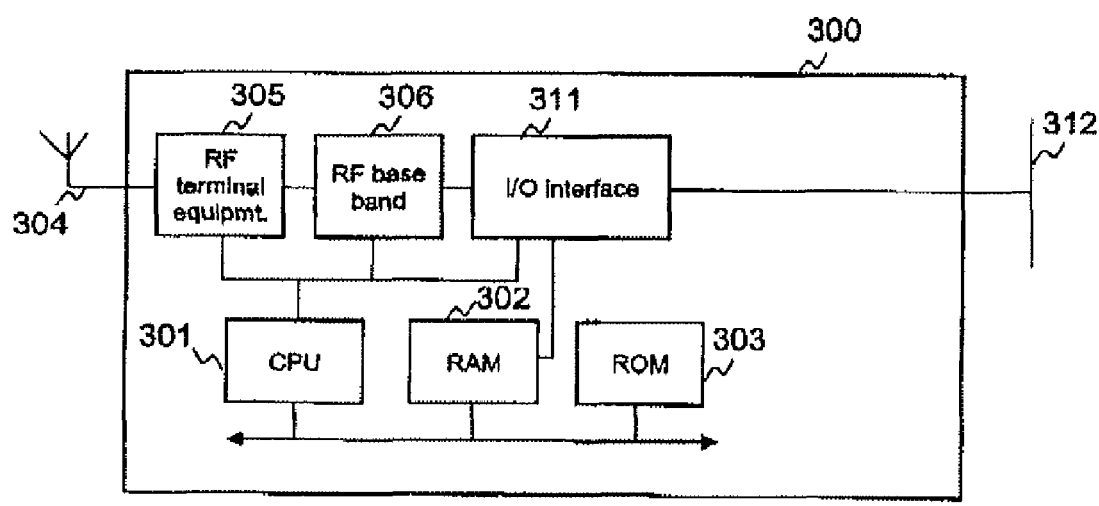
FIG. 3 is a diagram of a communication device which may implement the present invention, in a particular embodiment.

FIG. 3 represents a particular embodiment of a communication device adapted to implement the present invention.

The device 300 may represent the source device 110 or the destination device 120 of the mesh network 100. The device 300 may also represent any relay device 130, the latter behaving both as a source or destination device.

The device 300 comprises a random access memory or RAM 302, which operates as a main memory, a processing unit or CPU 301, it being possible to extend the capacity of this memory by an optional random access memory connected by an expansion port (not illustrated in the Figure).

The processing unit 301 is capable of executing instructions on powering up of the communication device, those instructions being loaded from a read only memory or ROM 303. After powering up, the processing unit 301 is capable of executing instructions from the RAM 302 relative to a computer program, once those instructions have been loaded from the ROM 303 or from an external memory (not illustrated in the drawing).

If such a computer program is executed by the processing unit 301, it causes the execution of a part of or all of the steps of the flowcharts illustrated in FIGS. 4, 5a and 5b described below.

The device 300 further comprises a unit 305 or item of RF terminal equipment, given the task of adapting the signal output from a base band unit 306 before it is sent by the expedient of an antenna 304 (frequency transposition and power amplification, for example).

The item of RF terminal equipment 305 is furthermore adapted to receive a signal from the antenna 304 intended to be delivered to the base band unit 306. The base band unit 306 modulates/demodulates the digital data exchanged with the item of RF terminal equipment 305.

Figure 4:
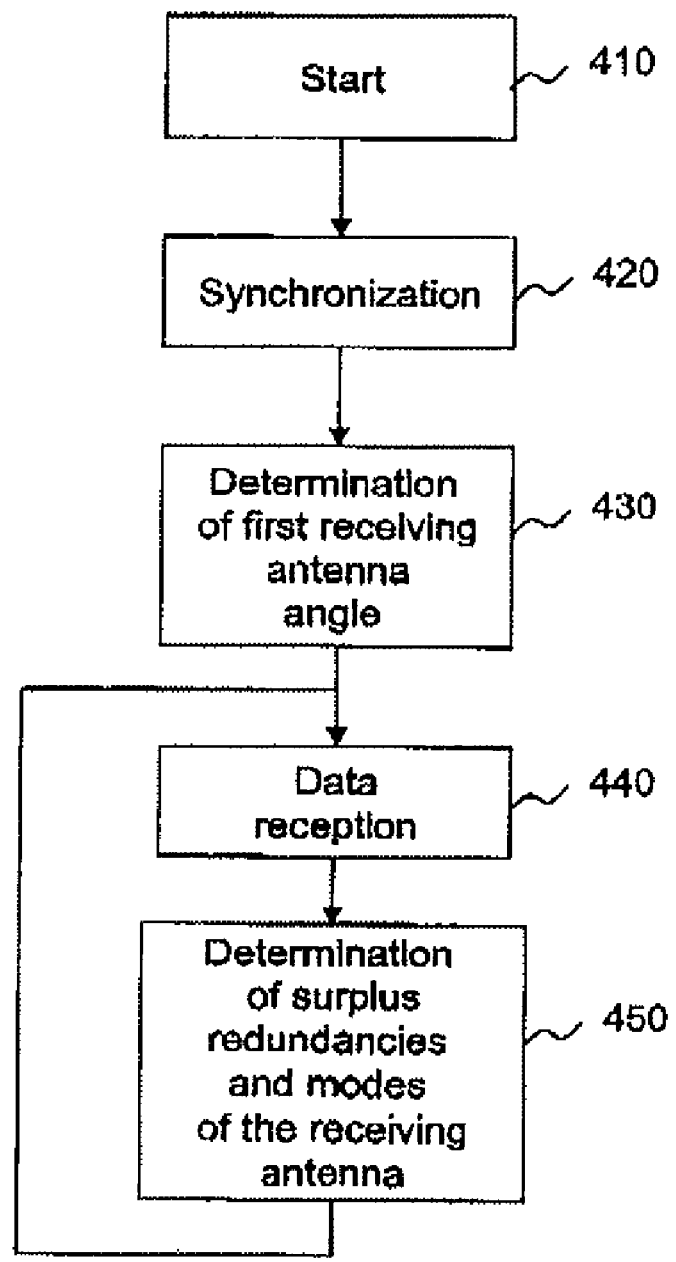
FIG. 4 is a flowchart illustrating the main steps of the management of a communication node in reception mode in a network of the type to which the present invention applies, in a particular embodiment.

The flowchart of FIG. 4 illustrates the main steps of the management of a communication node in reception mode in accordance with the present invention, in a particular embodiment.

The steps 410, 420 and 430 constitute the steps of initialization of the node in receiver mode.

At step 410, which is the starting up of the node, the latter searches in memory for the parameters of the network which concern it (number of nodes, allocation of the time slots to the various nodes, etc.).

Next, at step 420, the node passes into synchronization mode. In this mode, the node goes into reception mode with an antenna in omnidirectional mode and seeks to decode a predetermined signal. Once that predetermined signal has been received, the node may synchronize itself with the radio channel and, on the basis of the parameters retrieved at step 410, it may determine the times at which each of the other nodes of the network transmit.

At the following step 430, the node seeks to determine a first set of receiving antenna angles to use to receive the data sent by each of the transmitters (this set comprises one antenna angle for each transmitter). The determination of this angle may be made for example by measuring the energy received during a given time slot for different values of angles and by considering that the angle to use is the one giving the maximum energy.

Other techniques for determining the best angle to use for reception may possibly be used.

At the following step 440, the node receives and demodulates the data sent by each transmitter before processing them at the following step 450.

In a mesh network the date transmitted by a node may pass via different paths. Thus, several copies of the same data may be received by the recipient node.

This property of mesh networks is exploited in certain systems to improve the reliability of the data received: for example, if a node receives three different versions of the same data, the node may decide which are the most pertinent copies with regard to the number of identical copies received.

Furthermore, the use of error correction techniques is common in digital data processing systems. This is because an error correction device enables the maximum transport capacity to be obtained from a transmission medium. It furthermore enables the error rate of the transmission channel to be characterized and to know the maximum value thereof.

The error correction device may include a mechanism for detection of erasures, or missing symbols, by producing correlations for this purpose between each of the copies received by one of the devices of the network.

At such a data correlation phase, a device of the network may thus judge the pertinence of a copy received from the network in its decoding process. Pertinence of a copy means the contribution said copy makes as to the detection of erasures for an item of data of which at least two copies have been received.

In the case in which the communication conditions in the network are good, that is to say when there is no or when there is little concealment, it may be that a node receives a copy or copies which are not strictly necessary for correctly decoding the data transmitted by the source node.

In the case of a communication network of mesh type using a TDMA protocol, the repetitions required for the meshing of the network are made successively over time, over the same radio channel.

When the data source sends the data over the radio channel, those data are received by the various nodes of the network. These various nodes will then in turn re-send the data received from the source using the time slots allocated to them. According to the type of meshing used, the data will be repeated from 1 to N times over the radio channel (N being the number of nodes of the network, including the source).

As shown by FIG. 4, at step 450, which will be described in detail in relation with FIGS. 5a and 5b, the node determines the surplus redundancies of data, that is to say not indispensable for the decoding of the data sent by the source and it determines in which modes the receiving antenna will enter in the various time slots of the following frame: either RX mode (reception of data), or receiving Antenna Tracking (AT) mode (optimization of the receiving antenna orientation).

A description is given below in relation with FIGS. 5a and 5b of two variants of the algorithm implemented for this determination of the surplus redundancies.

Figure 5A:
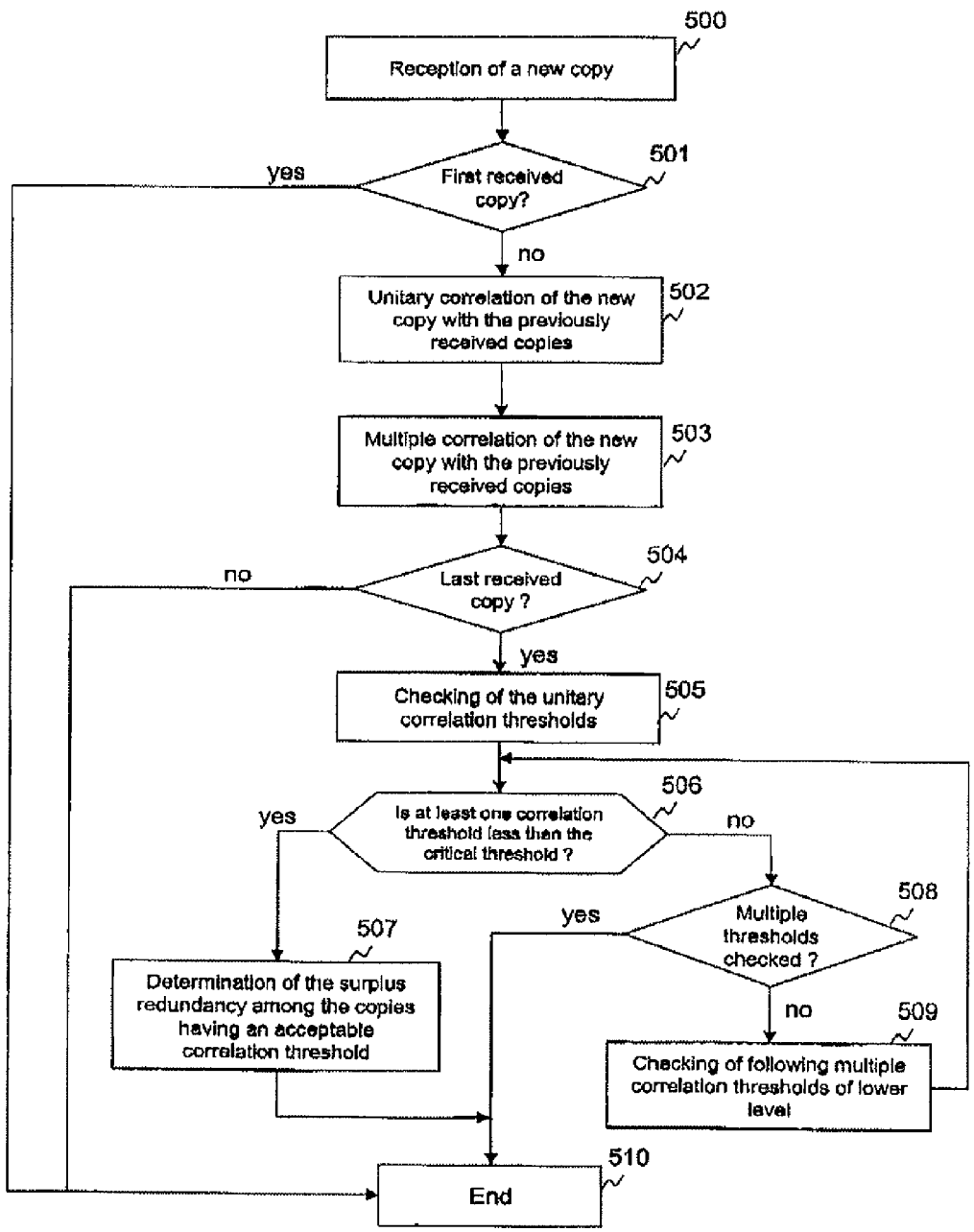
FIGS. 5a and 5b are flowcharts illustrating in detail two particular embodiments of the processing step 450 illustrated in FIG. 4.

The flowchart of FIG. 5a illustrates the main steps of a first variant of the algorithm applied to step 450 of FIG. 4.

The algorithm described here enables the orientation of the receiving antenna to be optimized for all the time slots corresponding to the surplus copies, without introducing any priority criterion concerning one or more specific time slots.

In this embodiment, if the copies which give the best correlation values are still the same, there is never any updating of the orientation of the receiving antenna of the receiver at time slots corresponding to those copies.

At step 500, a destination device 120 (as illustrated in FIG. 1) receives a new copy of a data packet, sent by a source device 110 or relay device 130 in its time slot 220 (as illustrated in FIG. 2).

If it is a first copy received, the destination device 120 proceeds to the end state 510. In the contrary case it proceeds to step 502.

At step 502, the destination device 120 correlates each of the symbols constituting the received packet with the corresponding symbol belonging to each of the copies of the same packet received previously. This step is termed unitary correlation step. The result of a correlation between two symbols is considered as positive if the bits constituting those two symbols are all identical pairwise. In the contrary case, the result of the correlation is considered as negative. The result of the overall correlation, or correlation threshold, for data packet will then be the total number of correlations, with regard to symbols, that obtained a negative result.

An example may be taken, that is in no way limiting, in which the destination device 120 receives copies coming from the source device 110 directly as well as via the relay devices 130, 131, 132 and 133.

The destination device 120 considers unitary correlation thresholds for the copies of data packets received from each of the possible pairs of devices: [130, 131], [130, 132], [130, 133], [131, 132], etc.

At the following step 503, the destination device 120 correlates each of the symbols constituting the packet received at step 500 with the corresponding symbol belonging to two other copies of the same packet received previously. Once this comparison has been carried out for each pair of copies received previously, it does the same with groups no longer of two, but of three copies received previously, and so forth. This step is termed multiple correlation step.

In the above example, the device 120 thus considers multiple correlation thresholds for the copies of data packets received from each of the possible groups of devices (groups of three and four copies): [110, 130, 131], [110, 131, 132], . . . , [131, 132, 133] and [130, 131, 132, 133].

If there are insufficient copies available to make groups of two copies (or more) received previously, or once all the multiple correlations have been carried out, the destination device 120 proceeds to step 504.

At step 504, the destination device 120 determines whether the copy received at step 500 is the last copy received for the data packet considered. This determination may be made on the basis of an item of information contained in the data block 230 illustrated in FIG. 2, or by counting the packets received, if the number of copies of the same data block is known to the destination device 120.

If it is the last received copy, the destination device 120 proceeds to step 505. In the contrary case, the destination device 120 proceeds to the final state 510.

At step 505, the destination device 120 verifies the unitary correlation thresholds.

At step 506, the destination device 120 determines whether at least one of the correlation thresholds considered at the preceding step is less than a pre-established critical threshold depending on the correction capacity of the error correcting code used to protect the data packets.

Correction capacity means the maximum number of erroneous symbols that the error correcting code can correct within the same data packet.

If no unitary correlation threshold is less than the critical threshold, the destination device 120 tests, at step 508, whether the multiple correlation thresholds have been verified. If that is the case, the destination device 120 proceeds to the final state 510; in the contrary case; it proceeds to step 509, at which it then verifies the multiple correlation thresholds before returning to step 506.

In a variant of the invention, the destination device 120 may, at step 505, consider at the same time the unitary correlation thresholds and the multiple correlation thresholds, in order to make less drastic the calculation of the surplus redundancy made at step 507 described below.

If, at step 506, at least one of the correlation thresholds considered at the preceding step is less than the critical threshold, the destination device 120 proceeds to the step 507.

At step 507, the destination device 120 hierarchizes the correlation thresholds less than the critical threshold, on the basis of the value of the critical threshold kept at step 506.

At the issue of this hierarchization step, the copies of the current data block corresponding to the best correlation threshold (unitary or multiple) are then considered as necessary for the decoding of said data block. The other copies received are thus considered by the destination device 120 as unnecessary for the decoding of its own data and the transmission slots of the relay devices 130, 131, 132, or 133 dedicated to those copies are then considered by the device 120 as bearing surplus data.

At the issue of step 507, the destination device 120 positions the receiving antenna in AT mode for the data transmission slots bearing surplus data, and in RX mode for the data transmission slots bearing the copies considered as necessary for the decoding of the data sent by the source.

It then proceeds to the final state 510.

In the non-limiting example given above, the destination device 120 has classified the correlation threshold of the pair [130, 132] as being the best, this threshold furthermore being less than the critical threshold. The destination device 120 thus deduces therefrom that only the copies received from the devices 130 and 132 are necessary to it for the decoding of its own data. The transmission time slots of the devices 131 and 133 reserved for the transmission of data intended for device 120 are thus considered by the latter as bearing surplus data. An optimization of the orientation of the receiving antenna will thus be carried out during those time slots.

Figure 5B:
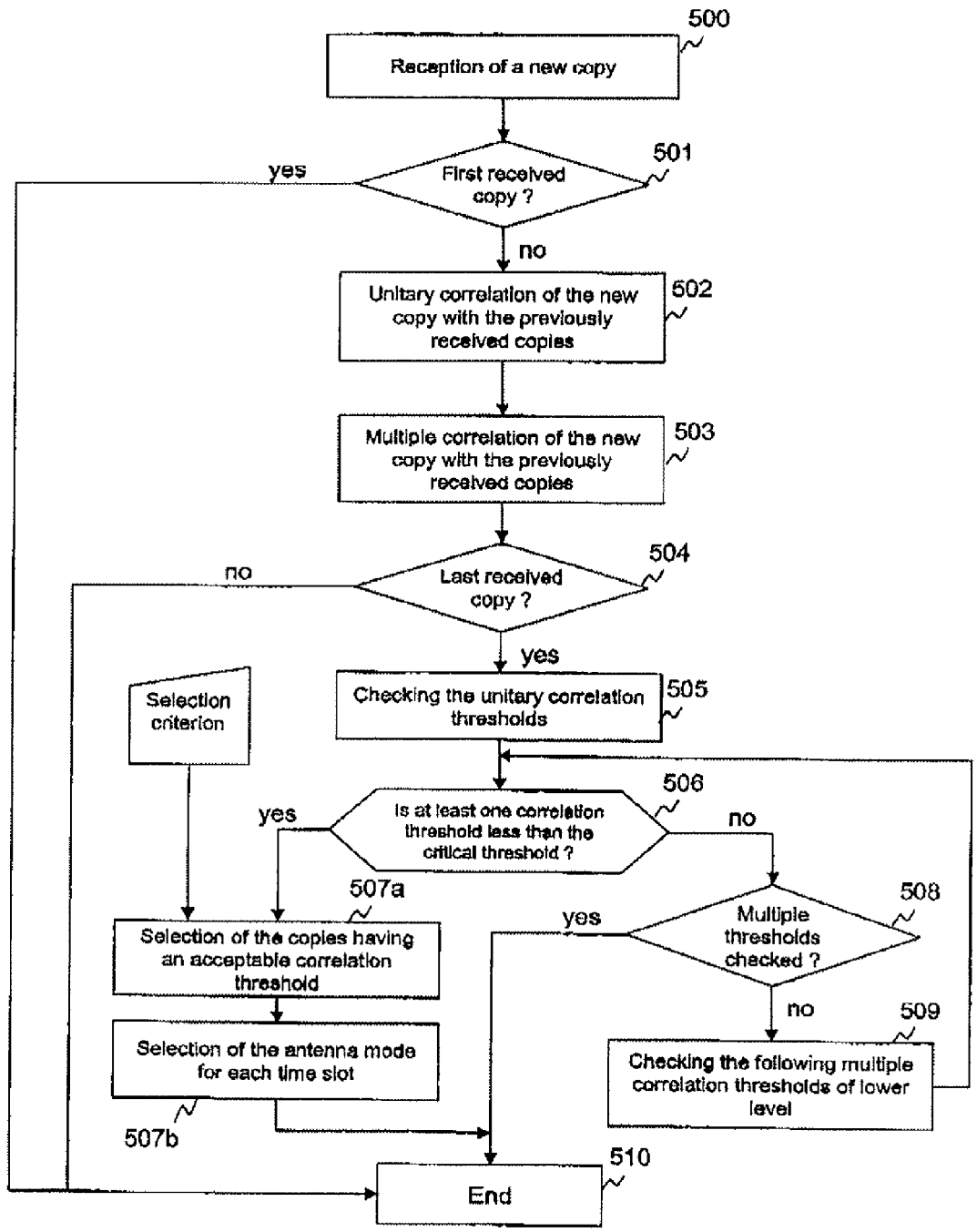

The flowchart of FIG. 5*b* illustrates the main steps of a second variant of the algorithm applied to step 450 of FIG. 4.

The algorithm described here makes it possible to optimize the orientation of the receiving antenna for all the time slots corresponding to the surplus copies by introducing a priority criterion. The introduction of such a criterion may have several aims: it may for example be to activate the optimization of the receiving antenna orientation over the greatest possible number of time slots (first case) or, on the contrary, to activate that optimization in preference for certain nodes having a predefined characteristic (second case).

In the first case, a counter is attached to each time slot and incremented each time the corresponding antenna angle is optimized. In deciding, for example, to select, as necessary copies, the combination of the copies which has a correlation threshold judged acceptable and which has a sum of its attached counters which is the highest, the antenna angles of the various time slots will be updated successively provided that each time slot supplies usable copies.

In the second case, a particular characteristic of each node may serve to grant a priority to the optimization of the receiving antenna orientation. This characteristic may for example be the probability of a node being moved. Indeed, a camera may be moved more easily than a video screen; it is thus advantageous to update the pointing angle of the antenna oriented towards the camera more often than that of the antenna oriented towards the screen.

By deciding, for example, to select as necessary copies the combination of the copies which has a correlation threshold judged acceptable and which preferably correspond to sending nodes of fixed type, the antenna angles of the time slots allocated to the reception of the data coming from nodes liable to be moved will be updated more often.

In this second variant of the algorithm for determining surplus redundancy, only step 507 differs from the first variant. Only this difference is described below.

In the first variant, step 507 consists of hierarchizing the correlation thresholds less than the critical threshold, on the basis of the value of the critical threshold kept at step 506.

In that second variant, when the destination device 120 determines at step 506 that at least one correlation threshold is less than the critical threshold, it proceeds to step 507*a*, during which it hierarchizes the various copies on the basis of the correlation thresholds and of the chosen priority criterion.

Next, at step 507*b*, the destination device 120 positions the receiving antenna in AT mode for the data transmission time slots bearing surplus data, and in RX mode for the data transmission time slots bearing the copies considered as necessary for the decoding of the data sent by the source.

Figure 6:
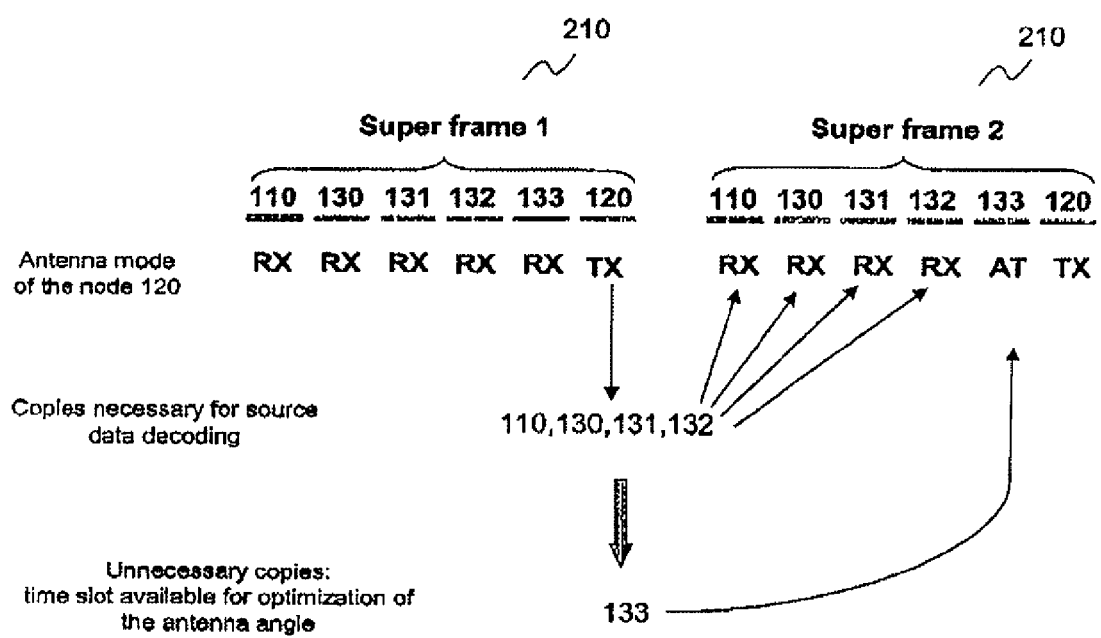
FIG. 6 is a diagram of a particular example of implementation of the invention.

FIG. 6 illustrates an example, that is in no way limiting, of implementation of the invention.

In this example, a mesh network is considered with six nodes at a given time where node 110 is the source node, node 120 is the destination node and nodes 130 and 133 are relay nodes, with the received data always being repeated.

The TDM sequence is thus constituted by six time slots. Node 120 thus receives five copies of the signal sent by the source.

At the issue of the operation of determining the surplus redundancy (step 507 in FIG. 5a), the copies from nodes 110, 130, 131, 132 have been determined as indispensable for the decoding of the data sent by the source 110, whereas the copy received from node 133 has been determined as not indispensable.

In accordance with the present invention, the system thus positions the receiving antenna of node 120 in AT mode for the next time slot corresponding to the sending from node 133 in the following TDM sequence.

At the time of that TDM sequence, no valid copy will be received from that node 133, but the antenna angle will be optimized. Then it will be possible for the algorithm described above to be applied again to determine which antenna angle could be updated.

The frequency of application of the algorithm (number of successive TDM sequences in AT mode, decision to place a new antenna angle in AT mode, etc.) will be chosen by the person skilled in the art on the basis of the parameters of the system such as the speed of sweeping through all the antenna angles, the method of determining the value of the best angle, the stability of the network, the knowledge of the type of the devices used in the system, etc.

In the foregoing description, for the purpose of simplification, it has been considered that each relay node resent only the data which it had just received from a source in the current TOM sequence. However, the implementation of some TDMA systems provides for the interleaving of different types of data; this may be temporal interleaving or interleaving from the source of the data sent.

For example, some systems provide that some relay nodes re-send the data received of the preceding TDM sequence whereas other nodes re-send data received in the current TDM sequence.

In another example, the relay nodes resend data which are specific to them, in addition to the data to relay.

These embodiments do not exclude the use of the present invention, because the timestamping and/or marking of the source of each of the copies will be necessary for proper decoding of the data in the mesh network; it will thus suffice to take account thereof at the time of the correlations between the various copies.

What is claimed is:

1. A method of optimizing the orientation of a receiving antenna of a recipient node, in a mesh communication network comprising a plurality of sending nodes and using a time division multiple access (TDMA) protocol in which each sending node is allocated to a predetermined time slot, said recipient node receiving a plurality of redundant copies of the same item of data sent by the sending nodes, wherein said method comprises steps of:
determining a first set of antenna angles to be used by said receiving antenna to capture data respectively sent by each of the sending nodes of the network;
receiving data sent by each of said sending nodes using the respective antenna angle of said first set of antenna angles;
performing at least one operation of correlation between the various redundant copies of the same item of data, received by the recipient node;
on the basis of said correlation operations, determining at least one redundant copy that is unnecessary for the decoding of the data received during the receiving step;
determining at least one time slot during which said at least one redundant copy that is unnecessary for the decoding is received; and
during said at least one time slot, updating the antenna angle used by said receiving antenna to receive data sent by the sending node allocated to said time slot.

2. A method according to claim 1, further comprising a selecting step, consisting of hierarchizing said redundant copies determined as unnecessary for the decoding of the received data, on the basis of a chosen priority criterion, so as to select a predetermined number of time slots from among the time slots during which said unnecessary redundant copies are received, and in that the antenna angles used by said receiving antenna to receive data sent by the sending nodes allocated to the selected time slots are updated.

3. A method according to claim 2, wherein the priority criterion is the probability of the node sending a redundant copy being moved.

4. A method according to claim 1, in which the data sent are organized in the form of packets constituted by symbols, wherein the step of performing at least one operation of correlation between the various redundant copies of the same item of data comprises:
a step of unitary correlation, consisting of correlating each of the symbols constituting a received packet with the corresponding symbol belonging to each of the copies received previously of the same packet; and
a step of multiple correlation, consisting of correlating each of the symbols constituting a received packet with the corresponding symbol belonging to a group of M copies received previously of the same packet, M successively having the value from 2 to the total number of copies previously received of the same packet.

5. A method according to claim 1, in which the data sent are organized in the form of packets constituted by symbols, and in which a correlation threshold is defined for a data packet as the total number of correlation operations between two symbols for which the bits constituting the two symbols are not all identical pairwise, wherein the method further comprises a step of determining whether, at the issue of the correlation operations, at least one correlation threshold is less than a predetermined critical threshold.

6. A method according to claim 5, wherein an error correcting code is utilized, and wherein said critical threshold depends on the maximum number of erroneous symbols that the error correcting code can correct within the same packet.

7. A method according to claim 1, wherein the network is of mmWave WPAN ("Millimeter Wave Wireless Personal Area Network") type.

8. A device for optimizing the orientation of a receiving antenna of a recipient node, in a mesh communication network comprising a plurality of sending nodes and using a time division multiple access (TDMA) protocol in which each sending node is allocated to a predetermined time slot, said recipient node receiving a plurality of redundant copies of the same item of data sent by said sending nodes, wherein said device comprises:
a first determining unit constructed to determine a first set of antenna angles to be used by said receiving antenna to capture data respectively sent by each of the sending nodes of the network;
a receiving unit constructed to receive data sent by each of said sending nodes using the respective antenna angle of said first set of antenna angles;

a performing unit constructed to perform at least one operation of correlation between the various redundant copies of the same item of data, received by the recipient node;

a second determining unit constructed to determine, on the basis of said correlation operations, at least one redundant copy that is unnecessary for the decoding of the data received by said receiving unit;

a third determining unit constructed to determine at least one time slot during which said at least one redundant copy that is unnecessary for the decoding is received; and an updating unit constructed to update the antenna angle, during said at least one time slot, that is used by said receiving antenna to receive data sent by the sending node allocated to said time slot.

9. A device according to claim 8, further comprising a selecting unit constructed to hierarchize said redundant copies determined as unnecessary for the decoding of the received data, on the basis of a chosen priority criterion, so as to select a predetermined number of time slots from among the time slots during which said unnecessary redundant copies are received, and in that the updating unit is further constructed to update the antenna angles used by said receiving antenna to receive data sent by the sending nodes allocated to the selected time slots.

10. A device according to claim 9, wherein the priority criterion is the probability of the node sending a redundant copy being moved.

11. A device according to claim 8, in which the data sent are organized in the form of packets constituted by symbols, wherein the performing unit comprises:

a unitary correlation unit constructed to correlate each of the symbols constituting a received packet with the corresponding symbol belonging to each of the copies received previously of the same packet; and a multiple correlation unit constructed to correlate each of the symbols constituting a received packet with the corresponding symbol belonging to a group of M copies received previously of the same packet, M successively having the value from 2 to the total number of copies previously received of the same packet.

12. A device according to claim 8, in which the data sent are organized in the form of packets constituted by symbols, and in which a correlation threshold is defined for a data packet as the total number of correlation operations between two symbols for which the bits constituting the two symbols are not all identical pairwise, wherein the device further comprises a fourth determining unit constructed to determine whether, at the issue of the correlation operations, at least one correlation threshold is less than a predetermined critical threshold.

13. A device according to claim 12, wherein an error correcting code is utilized, and wherein said critical threshold depends on the maximum number of erroneous symbols that the error correcting code can correct within the same packet.

14. A device according to claim 8, wherein the network is of 20 mmWave WPAN ("Millimeter Wave Wireless Personal Area Network") type.

15. A non-transitory computer-readable storage medium on which is stored a computer program that when executed by a computer or a microprocessor implements an optimizing method according to claim 1.

* * * * *